United States Patent
Zeng et al.

(10) Patent No.: US 12,511,821 B2
(45) Date of Patent: Dec. 30, 2025

(54) VIRTUAL AVATAR RENDERING METHOD AND APPARATUS, ELECTRONIC DEVICE, AND STORAGE MEDIUM

(71) Applicant: Beijing Zitiao Network Technology Co., Ltd., Beijing (CN)

(72) Inventors: Weihong Zeng, Beijing (CN); Xu Wang, Beijing (CN)

(73) Assignee: Beijing Zitiao Network Technology Co., Ltd., Beijing (CN)

(*) Notice: Subject to any disclaimer, the term of this patent is extended or adjusted under 35 U.S.C. 154(b) by 0 days.

(21) Appl. No.: 18/960,473

(22) Filed: Nov. 26, 2024

(65) Prior Publication Data
US 2025/0111594 A1 Apr. 3, 2025

Related U.S. Application Data

(63) Continuation of application No. PCT/CN2023/094918, filed on May 18, 2023.

(30) Foreign Application Priority Data

May 27, 2022 (CN) .......................... 202210594732.2

(51) Int. Cl.
*G06T 15/20* (2011.01)
*G06T 13/40* (2011.01)
(Continued)

(52) U.S. Cl.
CPC .......... *G06T 15/205* (2013.01); *G06T 13/40* (2013.01); *G06V 10/751* (2022.01);
(Continued)

(58) Field of Classification Search
CPC .......... G06T 15/04; G06T 19/20; G06T 7/90; G06T 7/62; G06T 13/40; G06T 17/10;
(Continued)

(56) References Cited

U.S. PATENT DOCUMENTS

2011/0292051 A1 12/2011 Nelson et al.
2013/0106852 A1 5/2013 Woodhouse et al.
(Continued)

FOREIGN PATENT DOCUMENTS

| CN | 106971374 A | 7/2017 |
| CN | 113269170 A | 8/2021 |
| CN | 113744374 A | 12/2021 |

OTHER PUBLICATIONS

Moe Bun, Select between 2D vs 3D avatar| Pros and Cons + Personal feed back, Jun. 14, 2021, https://www.youtube.com/watch?v=1xHCtGm51yw.*
(Continued)

*Primary Examiner* — Phu K Nguyen
(74) *Attorney, Agent, or Firm* — Alleman Hall & Tuttle LLP

(57) ABSTRACT

Embodiments of the present disclosure disclose a virtual avatar rendering method and apparatus, an electronic device, and a storage medium. The method includes: obtaining at least one component in a facial image; obtaining a grid image corresponding to the facial image by converting the at least one component into a grid component; and generating a virtual avatar based on the grid image and rendering the virtual avatar.

17 Claims, 5 Drawing Sheets

Facial image     Grid image     Grid image     Virtual brick avatar

(51) Int. Cl.
*G06V 10/75* (2022.01)
*G06V 40/16* (2022.01)

(52) U.S. Cl.
CPC .......... *G06V 40/171* (2022.01); *G06V 40/174* (2022.01); *G06T 2215/16* (2013.01); *G06V 2201/07* (2022.01)

(58) Field of Classification Search
CPC ... G06T 2219/2012; G06T 2207/30201; G06T 2207/20081; G06T 2207/20084; G06V 40/103; G06V 40/168
USPC .......................................... 345/418
See application file for complete search history.

(56) References Cited

U.S. PATENT DOCUMENTS

| | | | | |
|---|---|---|---|---|
| 2015/0070351 A1* | 3/2015 | Tarquini | ................. | G06T 17/20 345/419 |
| 2015/0302664 A1* | 10/2015 | Miller | ................. | G06F 3/012 345/633 |
| 2017/0080346 A1* | 3/2017 | Abbas | ................. | A63F 13/79 |
| 2021/0012549 A1* | 1/2021 | Comer | ................. | G06F 3/017 |
| 2024/0062445 A1* | 2/2024 | Sutton | ................. | G06T 15/04 |

OTHER PUBLICATIONS

Ble Lightning, Photoshop: Best Way to Create Classic, 8-Bit Pixel Art!, May 3, 2020, https://www.youtube.com/watch?v=TWE7CqfD6_M.*

PSDDude, Convert Image to Pixel Art in Photoshop, Nov. 24, 2022, https://www.youtube.com/watch?v=OMURFQT8oAI.*

Luan F, Paris S, Shechtman E, Bala K. Deep photo style transfer. InProceedings of the IEEE conference on computer vision and pattern recognition 2017 (pp. 4990-4998).*

Paier W, Hilsmann A, Eisert P. Example-based facial animation of virtual reality avatars using auto-regressive neural networks. IEEE Computer Graphics and Applications. Mar. 23, 2021;41(4):52-63.*

Richard A, Lea C, Ma S, Gall J, De la Torre F, Sheikh Y. Audio-and gaze-driven facial animation of codec avatars. InProceedings of the IEEE/CVF winter conference on applications of computer vision 2021 (pp. 41-50).*

Zhang J, Chen K, Zheng J. Facial expression retargeting from human to avatar made easy. IEEE Transactions on Visualization and Computer Graphics. Aug. 4, 2020;28(2):1274-87.*

Sun Q, Guo J, Liu Y. Face image synthesis from facial parts. EURASIP Journal on Image and Video Processing. May 10, 2022; 2022(1):7.*

Chris's works, "I highly recommend 7 toxic one-click generation tools, they are so useful!," Zhihu, May 6, 2020, 8 pages.

A Kaifeng hiao, "42 toolset for pixelating micro-block drawings," Zhihu, Dec. 1, 2020, 10 pages.

ISA China National Intellectual Property Administration, International Search Report Issued in Application No. PCT/CN2023/094918, Sep. 1, 2023, 4 pages.

European Patent Office, Extended European Search Report Issued in Application No. 23810931.8, Jun. 23, 2025, Germany, 8 pages.

Lennon, K. et al., "Image2Lgo: Customized LEGO Set Generation from Images," arXv:2108.08477v1, Aug. 19, 2021, 9 pages.

Li, Y. et al., "Facial Expression Transformation Based on Sketch Image and Multiscale Edges," Electronics and Communications in Japan, Part 3, vol. 84, No. 9, Jun. 1, 2001, 9 pages.

* cited by examiner

Facial image

Grid image

Grid image

Virtual brick avatar

_US 12,511,821 B2_

VIRTUAL AVATAR RENDERING METHOD AND APPARATUS, ELECTRONIC DEVICE, AND STORAGE MEDIUM

CROSS-REFERENCE TO RELATED APPLICATION(S)

The present disclosure is a continuation application of International Patent Application No. PCT/CN2023/094918, filed on May 18, 2023, which claims priority to Chinese Patent Application No. 202210594732.2, filed with the China National Intellectual Property Administration on May 27, 2022, which are incorporated herein by reference in their entireties.

FIELD

Embodiments of the present disclosure relate to the field of computer technology, and for example, relate to a virtual avatar rendering method and apparatus, an electronic device, and a storage medium.

BACKGROUND

A virtual avatar rendering method typically includes: extracting several features of a facial image, matching a virtual avatar with high similarity to each feature from a preset library, and rendering it.

SUMMARY

In a first aspect, an embodiment of the present disclosure provides a virtual avatar rendering method, including:
  obtaining at least one component in a facial image;
  obtaining a grid image corresponding to the facial image by converting the at least one component into a grid component; and
  generating a virtual avatar based on the grid image and rendering the virtual avatar.

In a second aspect, an embodiment of the present disclosure further provides a virtual avatar rendering apparatus, including:
  a component obtaining module, configured to obtain at least one component in a facial image;
  a component gridding module, configured to obtain a grid image corresponding to the facial image by converting the at least one component into a grid component; and
  a rendering module, configured to generate a virtual avatar based on the grid image and render the virtual avatar.

In a third aspect, an embodiment of the present disclosure further provides an electronic device. The electronic device includes:
  at least one processor; and
  a storage, configured to store at least one program, where where the at least one program, when executed by the at least one processor, causes the at least one processor to implement the virtual avatar rendering method according to any of the embodiments of the present disclosure.

In a fourth aspect, an embodiment of the present disclosure further provides a storage medium including computer executable instructions. The computer executable instructions, when executed by a computer processor, perform the virtual avatar rendering method according to any of the embodiments of the present disclosure.

BRIEF DESCRIPTION OF THE DRAWINGS

Throughout the accompanying drawings, the same or similar reference numerals denote the same or similar elements. It should be understood that the accompanying drawings are illustrative, and components and elements may not necessarily be drawn to scale.

DETAILED DESCRIPTION OF EMBODIMENTS

The embodiments of the present disclosure will be described in more detail below with reference to the accompanying drawings. It should be understood that the steps recorded in the method implementations in the present disclosure may be performed in different orders and/or in parallel. Further, additional steps may be included and/or the execution of the illustrated steps may be omitted in the method implementations. The scope of the present disclosure is not limited in this aspect.

The term "including" used herein and variations thereof are open-ended, namely "including but not limited to". The term "based on" is interpreted as "at least partially based on". The term "an embodiment" means "at least one embodiment"; the term "another embodiment" means "at least one additional embodiment"; and the term "some embodiments" means "at least some embodiments". Related definitions of other terms will be given in the description below.

It should be noted that concepts such as "first" and "second" mentioned in the present disclosure are only used to distinguish different apparatuses, modules, or units, and are not used to limit the order or relation of interdependence of functions performed by these apparatuses, modules, or units.

It should be noted that modifications such as "a" and "a plurality of" mentioned in the present disclosure are indicative rather than limiting, and those skilled in the art should understand that unless otherwise explicitly specified in the context, it should be interpreted as "at least one".

It should be understood that before the use of the technical solutions disclosed in the embodiments of the present disclosure, the user shall be informed of the type, range of use, use scenarios, etc., of personal information involved in the present disclosure in an appropriate manner in accordance with the relevant laws and regulations, and the authorization of the user shall be obtained.

It should be understood that data (including but not limited to the data itself, and data acquisition, or usage) involved in the technical solutions should comply with the requirements of corresponding laws and regulations, and relevant stipulations.

As described above, a virtual avatar rendering method typically includes: extracting several features of a facial image, matching a virtual avatar with high similarity to each feature from a preset library, and rendering it. The defects of the technology at least include: a presentation effect of the virtual avatar being limited by the setting of the preset library, making the virtual avatar unable to accurately represent a real face. Embodiments of the present disclosure provide a virtual avatar rendering method and apparatus, an electronic device, and a storage medium, which can avoid limitations imposed by the arrangement of a preset library, and make a virtual avatar better represent a real face.

Figure 1:
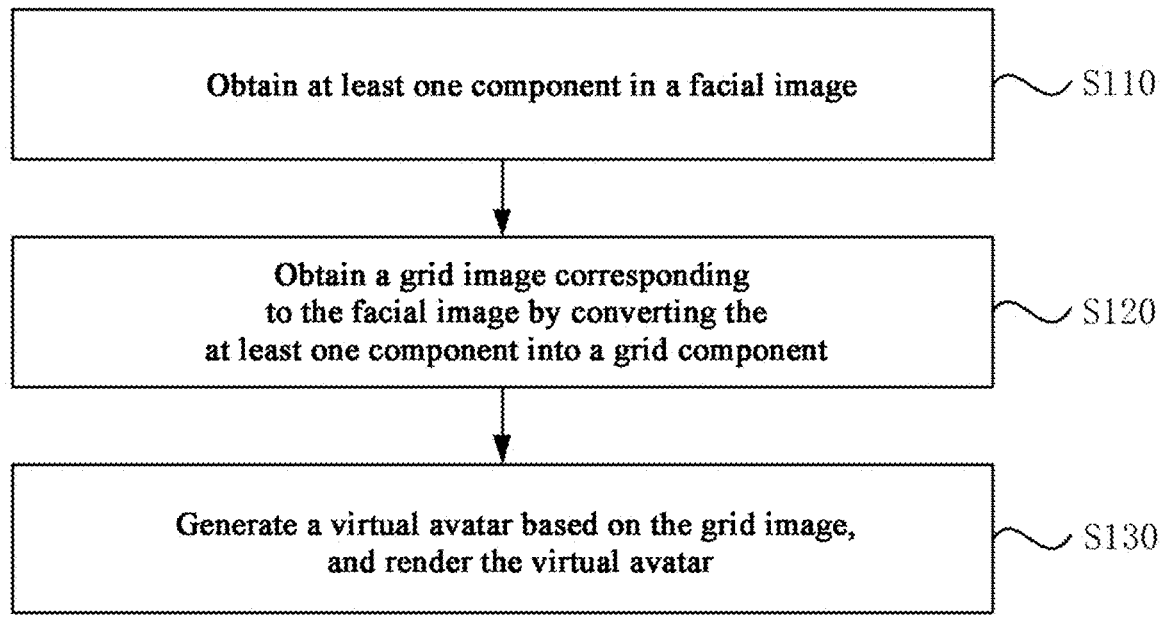
FIG. 1 is a schematic flowchart of a virtual avatar rendering method according to an embodiment of the present disclosure.

FIG. 1 is a schematic flowchart of a virtual avatar rendering method according to an embodiment of the present disclosure. This embodiment of the present disclosure is applicable to a case of rendering a virtual avatar. The method may be performed by a virtual avatar rendering apparatus. The apparatus may be implemented in the form of software and/or hardware. The apparatus may be configured in an electronic device, such as a mobile phone and a computer.

As shown in FIG. 1, the virtual avatar rendering method provided by this embodiment may include:

S110: Obtain at least one component in a facial image.

Figure 2:
FIG. 2 is a schematic diagram of various components of a facial image in a virtual avatar rendering method according to an embodiment of the present disclosure.

In this embodiment of the present disclosure, the at least one component in the facial image may include at least one of the following: the hair, the eyebrows, the eyes, the upper and lower lips, the nose, the ears, the facial skin, accessories (e.g., a hat and glasses) and other components. Exemplarily, FIG. 2 is a schematic diagram of various components of a facial image in a virtual avatar rendering method according to an embodiment of the present disclosure. The facial image shown in FIG. 2 includes components: the hat, the hair, the skin, the eyebrows, the glasses, the nose, and the mouth. An area shape of each component may be obtained by parsing the facial image. Different facial images may have different types of components, and the same type of components may vary across different facial images.

S120: Obtain a grid image corresponding to the facial image by converting the at least one component into a grid component.

In this embodiment of the present disclosure, the grid component may refer to a "pixel-style" component composed of grids and having obvious jagged edges. The grids in the grid component may include, but are not limited to, rectangular grids, square grids, circular grids, etc.

Each component in the facial image may be converted into a grid component through a conventional image processing algorithm or a network model, thereby obtaining a grid image corresponding to the facial image. The conventional image processing algorithm may, for example, aggregate pixels in each component to form a grid shape for the conversion of the grid component. The network model may be generated by pre-training based on paired component samples and grid component samples, and may be used for the conversion of the grid component after the training is completed. When each component in the facial image is converted into the grid component, the specific grid image corresponding to the facial image may be obtained.

In some optional implementations, converting at least one component into a grid component may include: swiping a preset window on the facial image at a preset step size; in a swiping process, determining a target component from the at least one component based on the number of pixels within the preset window that belong to the at least one component; setting the pixels within the preset window to pixel values corresponding to the target component; and upon completion of swipe, obtaining the grid component of the at least one component.

A corresponding relationship between different image resolutions, window sizes, and step sizes may be preset based on experimental values or empirical values, thereby achieving optimal grid effects at different image resolutions. A size of the preset window and a preset step size corresponding to a resolution of a current facial image may be determined based on the preset corresponding relationship. The preset window may be a rectangular or square window, and the preset step size may be the same as or different from the size of the preset window.

The preset window may be swiped sequentially (e.g., sequentially from left to right, and from top to bottom) on the facial image at the preset step size until the facial image is fully traversed. In the swiping process, at each position where the preset window is swiped, the number of pixels within the preset window that belong to the at least one component of the facial image can be counted, and the target component may be determined based on the number of pixels that belong to the at least one component.

The determining a target component from the at least one component based on the number of pixels within the preset window that belong to the at least one component may include, for example, using a component with the largest number of pixels as the target component; and/or, may include: determining a proportion of the number of pixels within the preset window that belong to the same component to the total number of pixels within the preset window; and if the proportion is greater than a preset threshold, using a component corresponding to the proportion as the target component. The preset proportion may be set based on empirical values or experimental values, such as 0.5.

Pixel values corresponding to the target component may be preset or obtained by parsing the color on each component in the facial image. By setting the pixel values within the preset window to pixel values corresponding to the target component, a color block with the same shape as the preset window may be obtained. When facial image traversal is complete, the swipe is finished, and in this case, the at least one component in the facial image is gridded, thereby obtaining various grid components.

Figure 3:
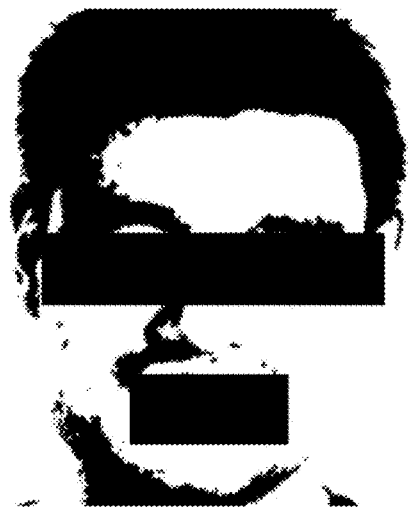
FIG. 3 is a schematic diagram of a facial image and a corresponding grid image in a virtual avatar rendering method according to an embodiment of the present disclosure.
Figure 3:
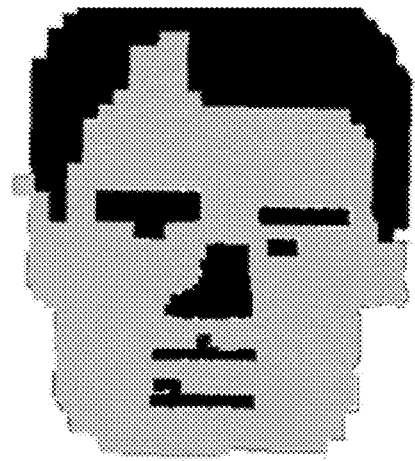

Exemplarily, FIG. 3 is a schematic diagram of a facial image and a corresponding grid image in a virtual avatar rendering method according to an embodiment of the present disclosure. In FIG. 3, the left side shows the facial image, and the right side shows the corresponding grid image. The hair, the eyebrows, the glasses, the nose, the mouth, and the skin in the facial image on the left side may be gridded separately to obtain the grid image on the right side.

The process of determining the grid image on the right side, for example, may include obtaining at least one component in the facial image on the left side. When the resolution of the facial image on the left side is 512×512 pixels, a square window with a window size of 16 may be selected as the preset window based on a preset corresponding relationship between an image resolution, a window size, and a step size, and a preset step size may be set to 16. The preset window is swiped from left to right, and from top to bottom on the facial image at the preset step size until the entire facial image is traversed. In the swiping process, at each position where the preset window is swiped, if the number of pixels of a certain component within the window is greater than half of the total number of pixels in the window, all pixels within the window may be set to pixel values of the component. When the swipe is complete, all components of the entire facial image may be gridded, thereby obtaining the grid image.

In these optional implementations, the facial image may be gridded by swiping the window to obtain the grid image.

S130: Generate a virtual avatar based on the grid image and render the virtual avatar.

In this embodiment of the present disclosure, the grid image may be directly used as a virtual avatar; or a certain effect (e.g., a glowing effect and an effect of being surrounded by love heart) may be added to the grid image to generate a virtual avatar, thereby generating a "pixel-style" virtual avatar.

Further, in some optional implementations, generating a virtual avatar based on a grid image may also include: setting a depth-direction size for each grid in the grid image to obtain a cuboid corresponding to the grid; drawing a brick pattern on a surface of the cuboid to obtain a brick block corresponding to the grid; and generating a virtual brick avatar by a plurality of brick blocks.

Figure 4:
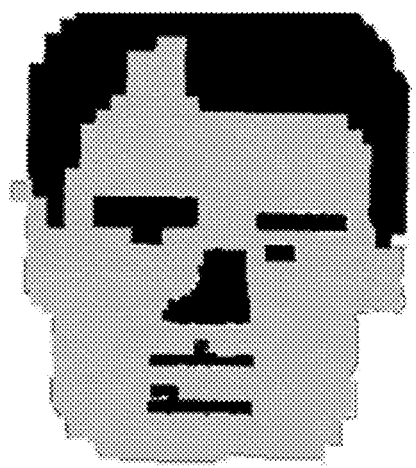
FIG. 4 is a schematic diagram of a grid image and a corresponding virtual brick avatar in a virtual avatar rendering method according to an embodiment of the present disclosure.
Figure 4:
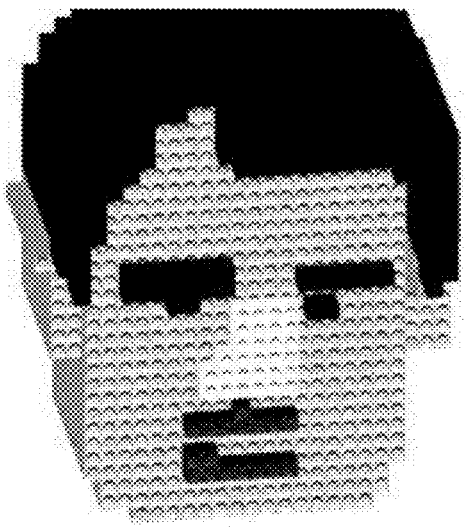

Exemplarily, FIG. 4 is a schematic diagram of a grid image and a corresponding virtual brick avatar in a virtual avatar rendering method according to an embodiment of the present disclosure. Referring to FIG. 4, the left side shows the grid image, and the right side shows the corresponding virtual brick avatar. The process of generating the virtual brick avatar on the right side may include, for example, using an open graphics library (OpenGL) or other graphics drawing tools to extend each grid in the grid image in a depth direction by a certain size to form a cuboid; and drawing patterns such as protrusions of bricks on a surface of the cuboid, thereby spatially presenting each grid corresponding to a cuboid brick block. The virtual brick avatar may be obtained by stacking the respective brick blocks, such that the virtual avatar has the characteristics of spatial three-dimension sense and brick construction.

In these implementations, by utilizing a surface mapping method and a spatial construction method, unique brick-like images may be generated based on grid images.

In the technical solution of this embodiment of the present disclosure, the at least one component in the facial image may be obtained; the at least one component is converted into the grid component to obtain the grid image corresponding to the facial image; and the virtual avatar is generated based on the grid image, and is rendered. In the technical solution of this embodiment of the present disclosure, image grid processing may be performed in conjunction with the area of the at least one component in the facial image, such that the virtual image is generated based on the grid image. Therefore, limitations imposed by the arrangement of the preset library are avoided, such that the virtual avatar can better represent a real face.

This embodiment of the present disclosure may be combined with various optional solutions in the virtual avatar rendering method provided in the above embodiment. In the virtual avatar rendering method provided by this embodiment, dynamic rendering of the virtual avatar is described in detail. By collecting a facial video of a target object and driving the virtual image based on an expression coefficient of the real face in the video, it is possible to synchronize the expression and the action of the virtual image with the target object, which is highly playable and interesting, thereby improving user experience.

Figure 5:
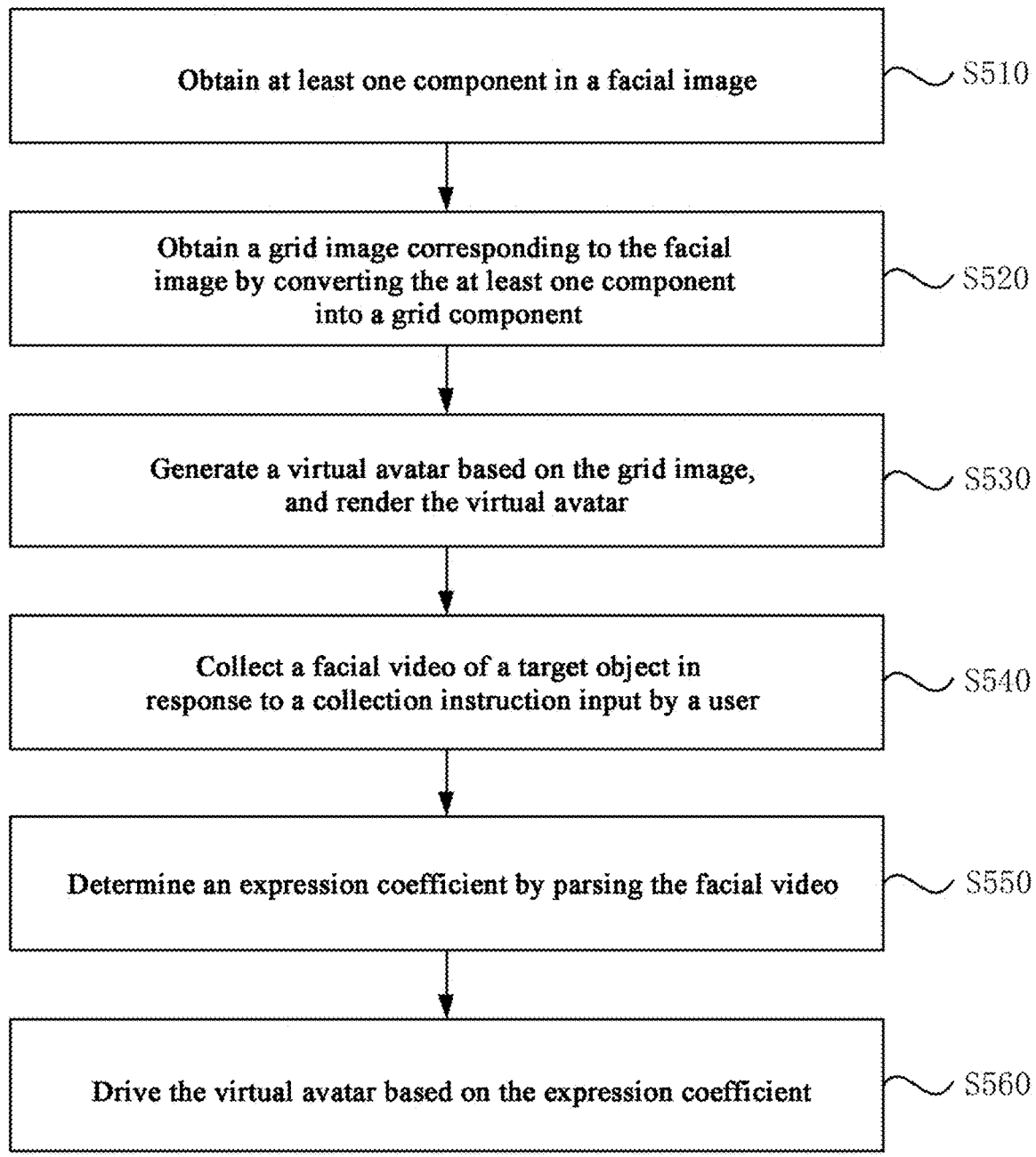
FIG. 5 is a schematic flowchart of another virtual avatar rendering method according to an embodiment of the present disclosure.

FIG. 5 is a schematic flowchart of another virtual avatar rendering method according to an embodiment of the present disclosure. As shown in FIG. 5, the virtual avatar rendering method provided by this embodiment may include:

S510: Obtain at least one component in a facial image.

S520: Obtain a grid image corresponding to the facial image by converting the at least one component into a grid component.

S530: Generate a virtual avatar based on the grid image and render the virtual avatar.

S540: Collect a facial video of a target object in response to a collection instruction input by a user.

In this embodiment, the facial video of the target object may be continuously collected by a collection device (such as a camera). The target object may be an object in the facial image, or may be an object not in the facial image. An effect of driving a virtual avatar similar to oneself may be achieved, and meanwhile, an effect of driving a virtual avatar similar to other objects may be achieved, thereby enriching prop gameplay and improving user experience.

S550: Determine an expression coefficient by parsing the facial video.

In this embodiment, the expression coefficient may include, for example, a Blend Shape expression coefficient, as well as a posture angle of the target object (e.g., a pitch angle, a yaw angle, and a roll angle). The expression coefficient of the target object may be captured in real time by continuously parsing the facial video.

S560: Drive the virtual avatar based on the expression coefficient.

In this embodiment, the virtual avatar is drivable. The driving the virtual avatar based on the expression coefficient may include at least one of the following: driving corresponding components in the virtual avatar to perform corresponding actions based on the obtained Blend Shape coefficient, such as driving the eyebrows up and down, opening and closing the mouth, blinking the eyes, and other actions in the virtual avatar. The entire head of the virtual avatar is controlled to perform a corresponding action based on the obtained posture angle, such as driving the entire head of the virtual avatar to nod up and down, shake left and right, and tilt side.

By obtaining the expression coefficient of a real face through a facial capture technology, and driving the generated virtual avatar in real time based on the expression coefficient, the virtual image may be synchronized with the expression and the action of the target object.

In some optional implementations, the grid component includes a skin component and a facial feature component. Correspondingly, after converting the at least one component into the grid component, the method further includes: completing a hollow area of the skin component and placing the completed skin component at a bottom layer of the facial feature component.

In a driving process, the facial feature component may deform (e.g., the mouth may open and close, and the eyebrows may move), and as a result, if the face skin is not completed, hollows may appear in an original area after deformation of facial features. In these optional implementations, after the at least one component is converted into the grid component, the hollow area of the skin component may also be completed, and the skin is placed at the bottom layer of the facial features. That is, the skin part below the facial feature component (e.g., the eyebrows, the eyes, the mouth, the nose, and other components) is completed. Therefore, hollow exposure may be avoided when the virtual avatar is driven to do the expression and the action, thereby improving a virtual avatar presentation effect to a certain degree.

In an implementation, when the virtual avatar is a virtual brick avatar, the virtual brick avatar may be generated based on the grid image after the skin component is completed. For example, the skin component may be extended to a larger size in the depth direction to present a head effect; and the facial feature component may be extended to a smaller size in the depth direction to present an effect of the facial features on the skin. In this case, when the virtual brick image is driven to perform the expression and the action based on the expression coefficient, hollows exposed due to deformation of the facial features can be avoided, thereby improving a rendering effect of the virtual brick image.

In the technical solution of this embodiment of the present disclosure, dynamic rendering of the virtual avatar is described in detail. By collecting the facial video of the target object and driving the virtual image based on the expression coefficient of the real face in the video, it is possible to synchronize the expression and the action of the virtual image with the target object, which is highly playable and interesting, thereby improving user experience. The virtual avatar rendering method provided in this embodiment of the present disclosure and the virtual avatar rendering method provided in the above embodiment belong to the same disclosure concept. For technical details not described in detail in this embodiment, reference may be made to the above embodiment.

This embodiment of the present disclosure may be combined with various optional solutions in the virtual avatar rendering method provided in the above embodiment. The virtual avatar rendering method provided by this embodiment gives an example of application scenarios for the virtual avatar. For example, the virtual avatar rendering method may be applied to various applications such as image editing, video clipping, and a multimedia platform.

In some optional implementations, the virtual avatar rendering method may be applied to a live streaming application. In this application scenario, before obtaining at least one component in a facial image, the method may also include: collecting a facial image of a target object (e.g., a streamer and/or a connected guest) in response to a live streaming instruction input by the user (e.g., the streamer).

Then, a virtual avatar corresponding to the collected facial image may be obtained based on any of virtual avatar rendering methods in the embodiments of the present disclosure. After generating the virtual avatar, rendering the virtual avatar may include: rendering the virtual avatar in a preset area of a live streaming page. The preset area may be set according to different application scenarios. For example, in a game live streaming scenario, the virtual avatar may be rendered in areas such as a side and a corner of the interface that do not affect a game screen. For another example, in a connected scenario, avatars of the streamer and the guest may be rendered in a center of a connected interface.

Applying the virtual avatar rendering method to the live streaming application can not only improve the fun of live streaming, but also protect the privacy of the target object.

Figure 6:
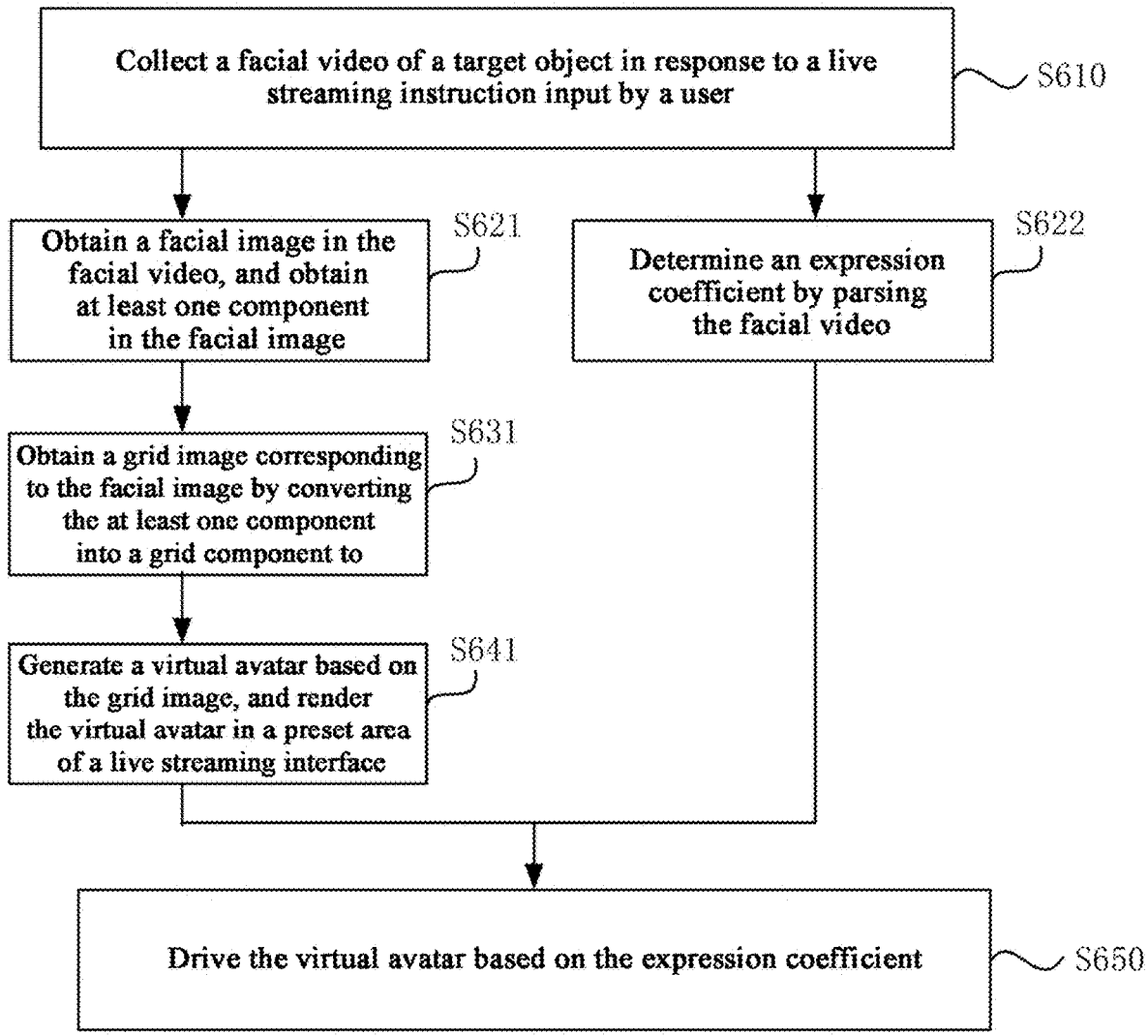
FIG. 6 is a schematic flowchart of another virtual avatar rendering method according to an embodiment of the present disclosure.

FIG. 6 is a schematic flowchart of another virtual avatar rendering method according to an embodiment of the present disclosure. Referring to FIG. 6, when the virtual avatar rendering method is applied to the live streaming application, the live streaming instruction input by the user may also achieve the effect of instruction collection. As shown in FIG. 6, when applied to the live streaming application, the virtual avatar rendering method may include:

S610: Collect a facial video of a target object in response to a live streaming instruction input by a user.

In this embodiment, the live streaming instruction input by the user (e.g., a streamer) may also achieve the effect of instruction collection, and the facial video of the target object (e.g., the streamer and/or a connected guest) may be collected.

S621: Obtain a facial image in the facial video, and obtain at least one component in the facial image.

In this embodiment, a frame of facial image may be arbitrarily captured from the facial video to generate a corresponding virtual avatar. Alternatively, a frame of high-quality facial image (e.g., a facial image with clear focus, appropriate brightness, and fewer noise points) may be obtained from a segment of facial video to generate a corresponding virtual avatar. The facial image may be parsed to obtain an area shape of the at least one component in the facial image.

S622: Determine an expression coefficient by parsing the facial video.

S631: Obtain a grid image corresponding to the facial image by converting the at least one component into a grid component.

S641: Generate a virtual avatar based on the grid image and render the virtual avatar in a preset area of a live streaming page.

The virtual avatar may be, for example, a virtual brick avatar.

S650: Drive the virtual avatar based on the expression coefficient.

In this embodiment, when the virtual avatar rendering method is applied to the live streaming application, the live streaming instruction input by the user may also achieve the effect of instruction collection, and the facial video of the target object is directly collected. A frame of facial image may be obtained from the facial video to generate a virtual avatar; and meanwhile the expression action of the target object may be captured in real time based on the facial image. After the virtual avatar is generated, the virtual avatar may be driven based on the parsed expression coefficient of the target object, such that the virtual avatar is synchronized with the expression action of the target object, which can not only improve the fun of live streaming, but also protect privacy of the target object.

In addition, the virtual avatar rendering method provided in this embodiment of the present disclosure and the virtual avatar rendering method provided in the above embodiment belong to the same disclosure concept. For technical details not described in detail in this embodiment, reference may be made to the above embodiment.

Figure 7:
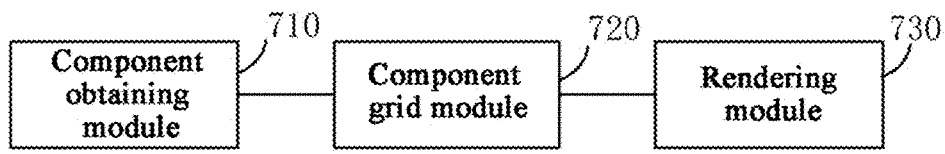
FIG. 7 is a structural schematic diagram of a virtual avatar rendering apparatus according to an embodiment of the present disclosure.

FIG. 7 is a structural schematic diagram of a virtual avatar rendering apparatus according to an embodiment of the present disclosure. The virtual avatar rendering apparatus provided by this embodiment is applicable to a case of rendering a virtual avatar.

As shown in FIG. 7, the virtual avatar rendering apparatus provided by this embodiment of the present disclosure may include:

a component obtaining module 710, configured to obtain at least one component in a facial image;

a component grid module 720, configured to obtain a grid image corresponding to the facial image by converting the at least one component into a grid component; and a rendering module 730, configured to generate a virtual avatar based on the grid image and render the virtual avatar.

In some optional implementations, the component grid module may be configured to:

swipe a preset window on the facial image at a preset step size;

in a swiping process, determine a target component from the at least one component based on a number of pixels within the preset window that belong to the at least one component;

set the pixels within the preset window to pixel values corresponding to the target component; and obtain, in response to completion of swipe, the grid component of the at least one component.

In some optional implementations, the component grid module may be configured to:

determine a proportion of the number of pixels within the preset window that belong to the same component to a total number of pixels within the preset window; and determine, in response to the proportion being greater than a preset threshold, a component corresponding to the proportion as the target component.

In some optional implementations, the rendering module may be configured to:

obtain a cuboid corresponding to each grid in the grid image by setting a depth-direction size for each grid;

obtain a brick block corresponding to each grid by drawing a brick pattern on a surface of the cuboid; and generate a virtual brick avatar by a plurality of brick blocks.

In some optional implementations, the rendering module may also be configured to:

collect, in response to a collection instruction input by a user, a facial video of a target object;

determine an expression coefficient by parsing the facial video; and drive the virtual avatar based on the expression coefficient.

In some optional implementations, the grid component includes a skin component and a facial feature component.

Correspondingly, the component grid module may also be configured to:

complete a hollow area of the skin component and place the completed skin component at a bottom layer of the facial feature component.

In some optional implementations, the apparatus is applied to a live streaming application.

Correspondingly, the virtual avatar rendering apparatus may further include:

an image collection module, configured to collect a facial image of a target object in response to a live streaming instruction input by the user prior to obtain at least one component in the facial image; and the rendering module may be configured to render the virtual avatar in a preset area of a live streaming page.

The virtual avatar rendering apparatus provided by this embodiment of the present disclosure may perform the virtual avatar rendering method provided by any embodiment of the present disclosure, and has the corresponding functional modules for performing the method.

It should be noted that the various units and modules included in the apparatus are only divided according to functional logics, but are not limited to the above division, as long as the corresponding functions can be achieved; and in addition, the specific names of the functional units are only for the convenience of distinguishing each other, and do not limit the scope of protection of the embodiments of the present disclosure.

Figure 8:
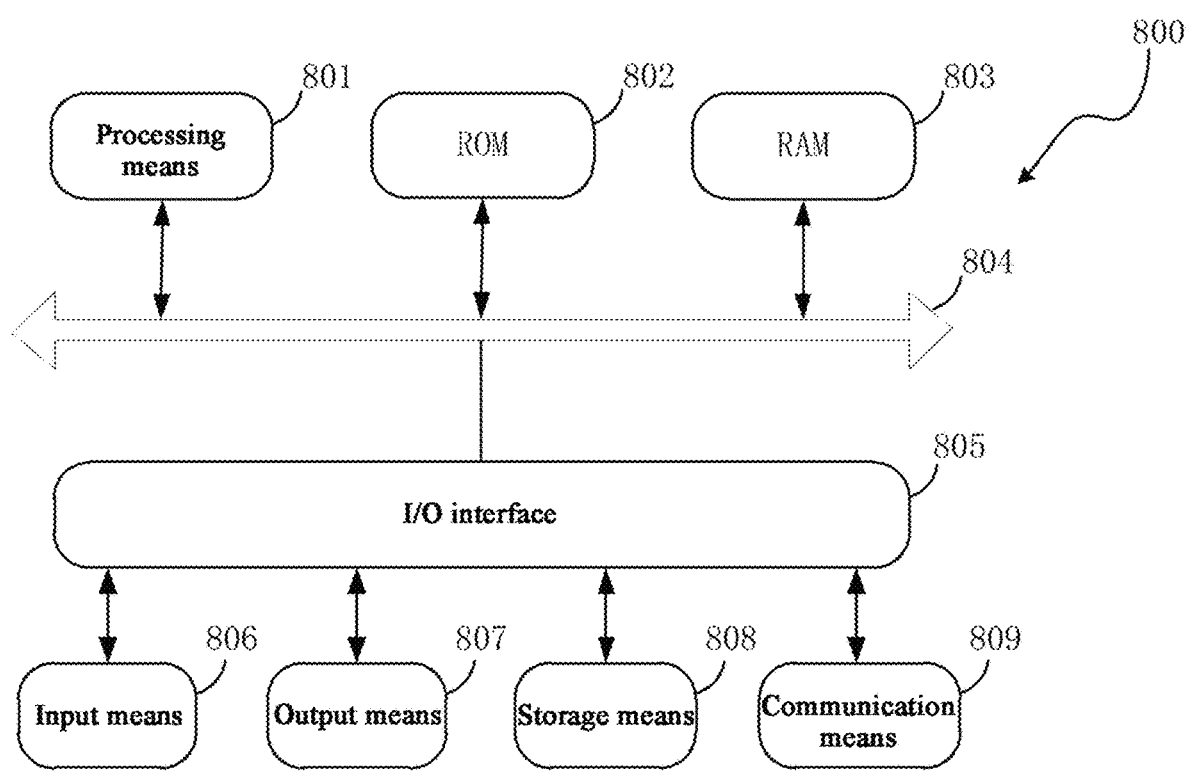
FIG. 8 is a structural schematic diagram of an electronic device according to an embodiment of the present disclosure.

Referring to FIG. 8 as below, FIG. 8 illustrates a structural schematic diagram of an electronic device (e.g., a terminal device or a server in FIG. 8) 800 suitable for implementing an embodiment of the present disclosure. The terminal device in this embodiment of the present disclosure may include, but is not limited to, mobile terminals such as a mobile phone, a notebook computer, a digital broadcast receiver, a personal digital assistant (PDA), a portable Android device (PAD), a portable media player (PMP), and a vehicle-mounted terminal (e.g., a vehicle navigation terminal), and fixed terminals such as a digital television (TV) and a desktop computer. The electronic device shown in FIG. 8 is merely an example, which should not impose any limitations on functions and application ranges of this embodiment of the present disclosure.

As shown in FIG. 8, the electronic device 800 may include a Processing means (e.g., a central processing unit and a graphics processing unit) 801 that may perform various suitable actions and processes based on a program stored in a read-only memory (ROM) 802 or a program loaded from a storage 808 into a random access memory (RAM) 803. The RAM 803 further stores various programs and data required for the operation of the electronic device 800. The Processing means 801, the ROM 802, and the RAM 803 are connected to one another through a bus 804. An input/output (I/O) interface 805 is also connected to the bus 804.

Typically, the following apparatuses may be connected to the I/O interface 805: an Input means 806, including, for example, a touchscreen, a touchpad, a keyboard, a mouse, a camera, a microphone, an accelerometer, and a gyroscope; an Output means 807, including, for example, a liquid crystal display (LCD), a speaker, and a vibrator; the storage 808, including, for example, a magnetic tape and a hard drive; and a Communication means 809. The Communication means 809 may allow the electronic device 800 to perform wireless or wired communication with other devices to exchange data. Although FIG. 8 illustrates the electronic device 800 with various apparatuses, it should be understood that it is not necessary to implement or have all the shown apparatuses. It may be an alternative to implement or have more or fewer apparatuses.

Particularly, the foregoing process described with reference to the flowcharts according to the embodiments of the present disclosure may be implemented as a computer software program. For example, an embodiment of the present disclosure includes a computer program product, which includes a computer program carried on a non-transitory computer-readable medium, where the computer program includes program code for performing the method shown in the flowchart. In this embodiment, the computer program may be downloaded and installed from the network through the Communication means 809, or installed from the storage 808, or installed from the ROM 802. The computer program, when executed by the Processing means 801, performs the above functions defined in the virtual avatar rendering method of this embodiment of the present disclosure.

The electronic device provided in this embodiment of the present disclosure and the virtual avatar rendering method provided in the above embodiment belong to the same disclosure concept. For technical details not described in detail in this embodiment, reference may be made to the above embodiment.

An embodiment of the present disclosure provides a computer storage medium, storing a computer program. The program, when executed by a processor, implements the virtual avatar rendering method provided by the above embodiment.

It should be noted that the computer-readable medium in the present disclosure may be either a computer-readable signal medium or a computer-readable storage medium, or any combination of the two. The computer-readable storage medium may be, for example, but is not limited to, electric, magnetic, optical, electromagnetic, infrared, or semiconductor systems, apparatuses, or devices, or any combination of the above. More specific examples of the computer-readable storage medium may include, but are not limited to: an electrical connection with one or more wires, a portable computer disk, a hard drive, a random access memory (RAM), a read-only memory (ROM), an erasable programmable read-only memory (EPROM) or a flash, an optical fiber, a portable compact disc read-only memory (CD-ROM), an optical storage device, a magnetic storage device, or any suitable combination of the above. In the present disclosure, the computer-readable storage medium may be any tangible medium including or storing a program, and the program may be used by or in conjunction with an instruction execution system, apparatus, or device. However, in the present disclosure, the computer-readable signal medium may include a data signal propagated in a baseband or as a part of a carrier, where the data signal carries computer-readable program code. The propagated data signal may take various forms, including but not limited to an electromagnetic signal, an optical signal, or any suitable combination of the above. The computer-readable signal medium may also be any computer-readable medium other than the computer-readable storage medium. The computer-readable signal medium may send, propagate, or transmit a program for use by or for use in conjunction with the instruction execution system, apparatus, or device. The program code included in the computer-readable medium may be transmitted by any suitable medium including but not limited to a wire, an optical cable, radio frequency (RF), etc., or any suitable combination of the above.

In some implementations, a client and a server may communicate using any currently known or future-developed network protocols such as a hyper text transfer protocol (HTTP), and may also be interconnected with digital data communication in any form or medium (e.g., a communication network). Examples of the communication network include a local area network (LAN), a wide area network (WAN), an internetwork (e.g., the Internet), a peer-to-peer network (e.g., an ad hoc peer-to-peer network), and any currently known or future-developed network.

The computer-readable medium may be included in the above electronic device; or may also separately exist without being assembled in the electronic device.

The above computer-readable medium carries at least one program, and the at least one program, when executed by the electronic device, causes the electronic device to: obtain at least one component in a facial image; convert the at least one component into a grid component to obtain a grid image corresponding to the facial image; and generate a virtual avatar based on the grid image and render the virtual avatar.

Computer program code for performing operations of the present disclosure may be written in one or more programming languages or a combination thereof, where the programming languages include, but are not limited to, object-oriented programming languages, such as Java, Smalltalk, and C++, and further include conventional procedural programming languages, such as "C" language or similar programming languages. The program code may be executed entirely on a user computer, partly on the user computer, as a stand-alone software package, partly on the user computer and partly on a remote computer, or entirely on the remote computer or the server. In the case of involving the remote computer, the remote computer may be connected to the user computer through any type of network, including a local area network (LAN) or a wide area network (WAN), or may be connected to an external computer (e.g., utilizing an Internet service provider for Internet connectivity).

The flowcharts and the block diagrams in the accompanying drawings illustrate the possibly implemented system architecture, functions, and operations of the system, the method, and the computer program product according to the various embodiments of the present disclosure. In this regard, each block in the flowcharts or the block diagrams may represent a module, a program segment, or a part of code, and the module, the program segment, or the part of code includes one or more executable instructions for implementing specified logic functions. It should also be noted that in some alternative implementations, the functions marked in the blocks may also occur in an order different from that marked in the accompanying drawings. For example, two blocks shown in succession may actually be performed substantially in parallel, or may sometimes be performed in a reverse order, depending on functions involved. It should also be noted that each block in the block diagrams and/or the flowcharts, and a combination of the blocks in the block diagrams and/or the flowcharts may be implemented by using a dedicated hardware-based system that performs specified functions or operations, or may be implemented by using a combination of dedicated hardware and computer instructions.

The related units described in the embodiments of the present disclosure may be implemented by software or hardware. The names of the unit and the module do not limit the unit and the module in certain cases.

Herein, the functions described above may be at least partially executed by one or more hardware logic components. For example, without limitation, exemplary hardware logic components that can be used include: a field programmable gate array (FPGA), an application specific integrated circuit (ASIC), application specific standard parts (ASSPs), a system on chip (SOC), a complex programmable logic device (CPLD), etc.

In the context of the present disclosure, a machine-readable medium may be a tangible medium that may include or store a program for use by or for use in conjunction with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include an electrical connection based on one or more wires, a portable computer disk, a hard drive, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination of the above content.

According to at least one embodiment of the present disclosure, [Example 1] provides a virtual avatar rendering method, including:
   obtaining at least one component in a facial image;
   obtaining a grid image corresponding to the facial image by converting the at least one component into a grid component; and generating a virtual avatar based on the grid image and rendering the virtual avatar.

According to at least one embodiment of the present disclosure, [Example 2] provides a virtual avatar rendering method, further including:
   in some optional implementations, the converting the at least one component into a grid component includes:
   swiping a preset window on the facial image at a preset step size;
   in a swiping process, determining a target component from the at least one component based on a number of pixels within the preset window that belong to the at least one component;
   setting the pixels within the preset window to pixel values corresponding to the target component; and
   obtaining, in response to completion of swipe, the grid component of the at least one component.

According to at least one embodiment of the present disclosure, [Example 3] provides a virtual avatar rendering method, further including:
   in some optional implementations, the determining a target component from the at least one component based on the number of pixels within the preset window that belong to the at least one component includes:
   determining a proportion of the number of pixels within the preset window that belong to the same component to a total number of pixels within the preset window; and
   determining, in response to the proportion being greater than a preset threshold, a component corresponding to the proportion as the target component.

According to at least one embodiment of the present disclosure, [Example 4] provides a virtual avatar rendering method, further including:
   in some optional implementations, the generating a virtual avatar based on the grid image includes:
   obtaining a cuboid corresponding to each grid in the grid image by setting a depth-direction size for each grid;
   obtaining a brick block corresponding to each grid by drawing a brick pattern on a surface of the cuboid; and
   generating a virtual brick avatar by a plurality of brick blocks.

According to at least one embodiment of the present disclosure, [Example 5] provides
   a virtual avatar rendering method, further including:
   in some optional implementations, the rendering the virtual avatar includes:
   collecting, in response to a collection instruction input by a user, a facial video of a target object;
   determining an expression coefficient by parsing the facial video; and
   driving the virtual avatar based on the expression coefficient.

According to at least one embodiment of the present disclosure, [Example 6] provides a virtual avatar rendering method, further including:
   in some optional implementations, the grid component includes a skin component and a facial feature component; and
   correspondingly, after converting the at least one component into the grid component, the method further comprises:
   completing a hollow area of the skin component and placing the completed skin component at a bottom layer of the facial feature component.

According to at least one embodiment of the present disclosure, [Example 7] provides a virtual avatar rendering method, further including:
   in some optional implementations, the method is applied to a live streaming application;
   correspondingly, prior to obtaining the at least one component in the facial image, the method further comprises: collecting, in response to a live streaming instruction input by the user, a facial image of a target object; and
   rendering the virtual avatar comprises: rendering the virtual avatar in a preset area of a live streaming page.

According to at least one embodiment of the present disclosure, [Example 8] provides a virtual avatar rendering apparatus, including:
   a component obtaining module, configured to obtain at least one component in a facial image;
   a component gridding module, configured to obtain a grid image corresponding to the facial image by converting the at least one component into a grid component; and
   a rendering module, configured to generate a virtual avatar based on the grid image and render the virtual avatar.

In addition, although the various operations are depicted in a specific order, it should not be understood as requiring these operations to be performed in the shown particular order or in a sequential order. In certain environments, multitasking and parallel processing may be advantageous. Similarly, although several specific implementation details are included in the above discussion, these specific implementation details should not be interpreted as limitations on the scope of the present disclosure. Some features that are described in the context of separate embodiments may also be implemented in combination in a single embodiment. In contrast, various features described in the context of a single embodiment may also be implemented in a plurality of embodiments separately or in any suitable sub-combination.

The invention claimed is:

1. A virtual avatar rendering method, comprising:
   obtaining at least one component in a facial image, wherein the at least one component comprises at least one of hair, an eyebrow, an eye, upper and lower lips, a nose, an ear, facial skin, or an accessory;
   obtaining a grid image corresponding to the facial image by converting the at least one component into a grid component; and
   generating a virtual avatar based on the grid image and rendering the virtual avatar,
   wherein converting the at least one component into the grid component comprises:
   swiping a preset window on the facial image at a preset step size;
   in a swiping process, determining a target component from the at least one component based on a number of pixels within the preset window that belong to the at least one component;
   setting the pixels within the preset window to pixel values corresponding to the target component; and
   obtaining, in response to completion of swipe, the grid component of the at least one component.

2. The method of claim 1, wherein determining the target component from the at least one component based on the number of pixels within the preset window that belong to the at least one component comprises:
  determining a proportion of the number of pixels within the preset window that belong to the same component to a total number of pixels within the preset window; and
  determining, in response to the proportion being greater than a preset threshold, a component corresponding to the proportion as the target component.

3. The method of claim 1, wherein generating the virtual avatar based on the grid image comprises:
  obtaining a cuboid corresponding to each grid in the grid image by setting a depth-direction size for each grid;
  obtaining a brick block corresponding to each grid by drawing a brick pattern on a surface of the cuboid; and
  generating a virtual brick avatar by a plurality of brick blocks.

4. The method of claim 1, wherein rendering the virtual avatar comprises:
  collecting, in response to a collection instruction input by a user, a facial video of a target object;
  determining an expression coefficient by parsing the facial video; and
  driving the virtual avatar based on the expression coefficient.

5. The method of claim 4, wherein the grid component comprises a skin component and a facial feature component; and
  correspondingly, after converting the at least one component into the grid component, the method further comprises:
  completing a hollow area of the skin component and placing the completed skin component at a bottom layer of the facial feature component.

6. The method of claim 1, wherein the method is applied to a live streaming application;
  correspondingly, prior to obtaining the at least one component in the facial image, the method further comprises: collecting, in response to a live streaming instruction input by a user, a facial image of a target object; and
  rendering the virtual avatar comprises: rendering the virtual avatar in a preset area of a live streaming page.

7. An electronic device, comprising:
  at least one processor; and
  a storage, configured to store at least one program,
  wherein the at least one program, when executed by the at least one processor, causes the at least one processor to:
    obtain at least one component in a facial image, wherein the at least one component comprises at least one of hair, an eyebrow, an eye, upper and lower lips, a nose, an ear, facial skin, or an accessory;
    obtain a grid image corresponding to the facial image by converting the at least one component into a grid component; and
    generate a virtual avatar based on the grid image and rendering the virtual avatar,
    wherein the at least one program causing the at least one processor to convert the at least one component into the grid component causes the at least one processor to:
      swipe a preset window on the facial image at a preset step size;
      in a swiping process, determine a target component from the at least one component based on a number of pixels within the preset window that belong to the at least one component;
      set the pixels within the preset window to pixel values corresponding to the target component; and
      obtain, in response to completion of swipe, the grid component of the at least one component.

8. The electronic device of claim 7, wherein the at least one program causing the at least one processor to determine the target component from the at least one component based on the number of pixels within the preset window that belong to the at least one component causes the at least one processor to:
  determine a proportion of the number of pixels within the preset window that belong to the same component to a total number of pixels within the preset window; and
  determine, in response to the proportion being greater than a preset threshold, a component corresponding to the proportion as the target component.

9. The electronic device of claim 7, wherein the at least one program causing the at least one processor to generate the virtual avatar based on the grid image causes the at least one processor to:
  obtain a cuboid corresponding to each grid in the grid image by setting a depth-direction size for each grid;
  obtain a brick block corresponding to each grid by drawing a brick pattern on a surface of the cuboid; and
  generate a virtual brick avatar by a plurality of brick blocks.

10. The electronic device of claim 7, wherein the at least one program causing the at least one processor to render the virtual avatar causes the at least one processor to:
  collect, in response to a collection instruction input by a user, a facial video of a target object;
  determine an expression coefficient by parsing the facial video; and
  drive the virtual avatar based on the expression coefficient.

11. The electronic device of claim 10, wherein the grid component comprises a skin component and a facial feature component; and the at least one program further causes the at least one processor to:
  correspondingly, after converting the at least one component into the grid component,
  complete a hollow area of the skin component and place the completed skin component at a bottom layer of the facial feature component.

12. The electronic device of claim 7, wherein the at least one program is executed for a live streaming application; and the at least one program further causes the at least one processor to:
  correspondingly, prior to obtaining the at least one component in the facial image, collect, in response to a live streaming instruction input by a user, a facial image of a target object; and
  the at least on program causing the at least one processor to render the virtual avatar causes the at least one processor to: render the virtual avatar in a preset area of a live streaming page.

13. A non-transitory storage medium comprising computer executable instructions, wherein the computer executable instructions, when executed by a computer processor, cause an electronic device to:
  obtain at least one component in a facial image, wherein the at least one component comprises at least one of hair, an eyebrow, an eye, upper and lower lips, a nose, an ear, facial skin, or an accessory;

obtain a grid image corresponding to the facial image by converting the at least one component into a grid component; and generate a virtual avatar based on the grid image and rendering the virtual avatar, wherein the instructions causing the electronic device to convert the at least one component into the grid component comprise instructions causing the electronic device to:

swipe a preset window on the facial image at a preset step size;

in a swiping process, determine a target component from the at least one component based on a number of pixels within the preset window that belong to the at least one component;

set the pixels within the preset window to pixel values corresponding to the target component; and obtain, in response to completion of swipe, the grid component of the at least one component.

14. The medium of claim 13, wherein the instructions causing the electronic device to determine the target component from the at least one component based on the number of pixels within the preset window that belong to the at least one component comprise instructions causing the electronic device to:

determine a proportion of the number of pixels within the preset window that belong to the same component to a total number of pixels within the preset window; and determine, in response to the proportion being greater than a preset threshold, a component corresponding to the proportion as the target component.

15. The medium of claim 13, wherein the instructions causing the at least one processor to generate the virtual avatar based on the grid image comprise instructions causing the electronic device to:

obtain a cuboid corresponding to each grid in the grid image by setting a depth-direction size for each grid;

obtain a brick block corresponding to each grid by drawing a brick pattern on a surface of the cuboid; and generate a virtual brick avatar by a plurality of brick blocks.

16. The medium of claim 13, wherein the instructions causing the electronic device to render the virtual avatar comprise instructions causing the electronic device to:

collect, in response to a collection instruction input by a user, a facial video of a target object;

determine an expression coefficient by parsing the facial video; and drive the virtual avatar based on the expression coefficient.

17. The medium of claim 16, wherein the grid component comprises a skin component and a facial feature component; and the instructions further comprise instructions causing the electronic device to:

correspondingly, after converting the at least one component into the grid component, complete a hollow area of the skin component and place the completed skin component at a bottom layer of the facial feature component.

* * * * *